May 12, 1964 H. E. SCHAFER 3,132,641
SERVING CART
Filed Sept. 12, 1962 2 Sheets-Sheet 2
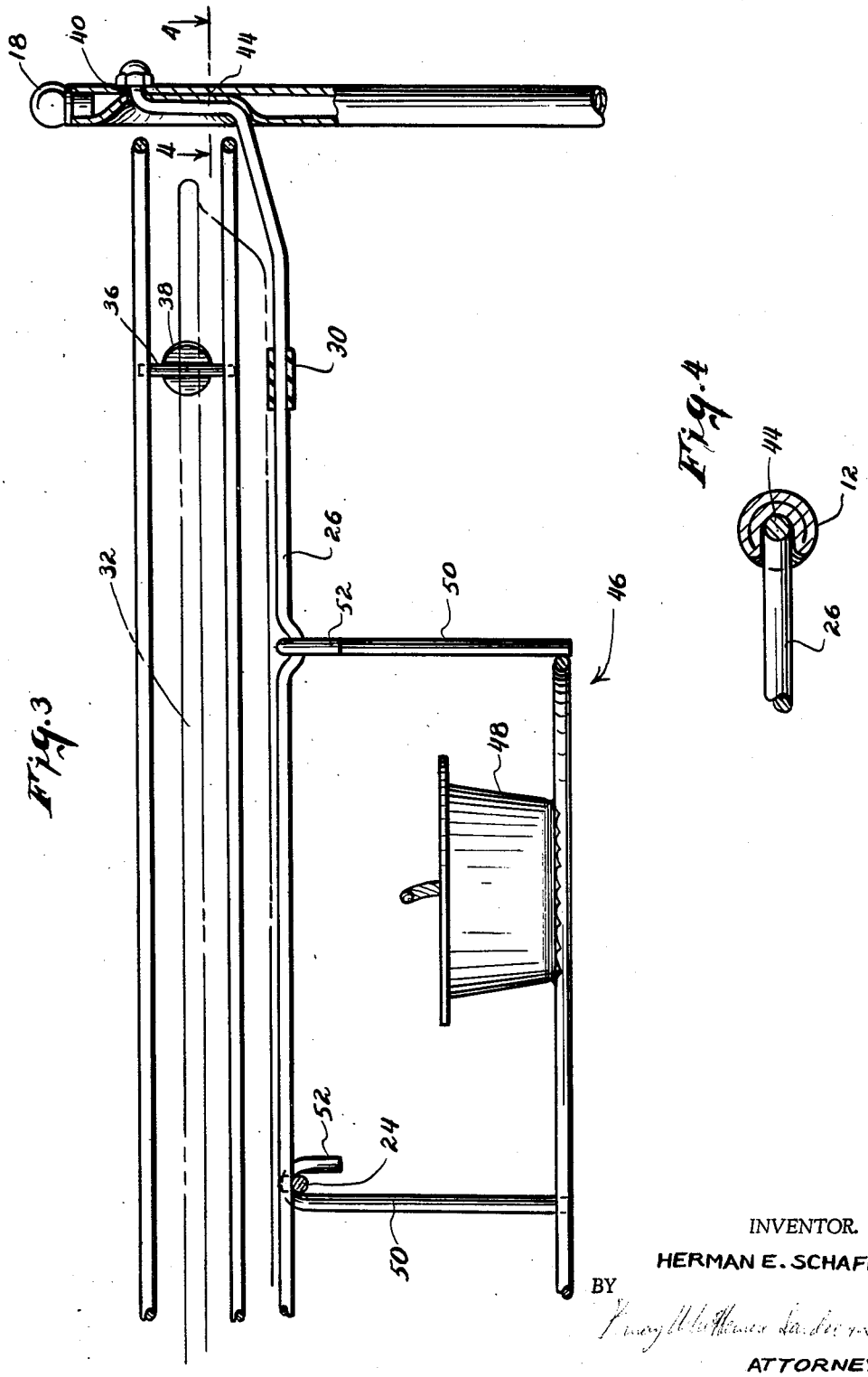
INVENTOR.
HERMAN E. SCHAFER
BY
ATTORNEYS

United States Patent Office 3,132,641
Patented May 12, 1964

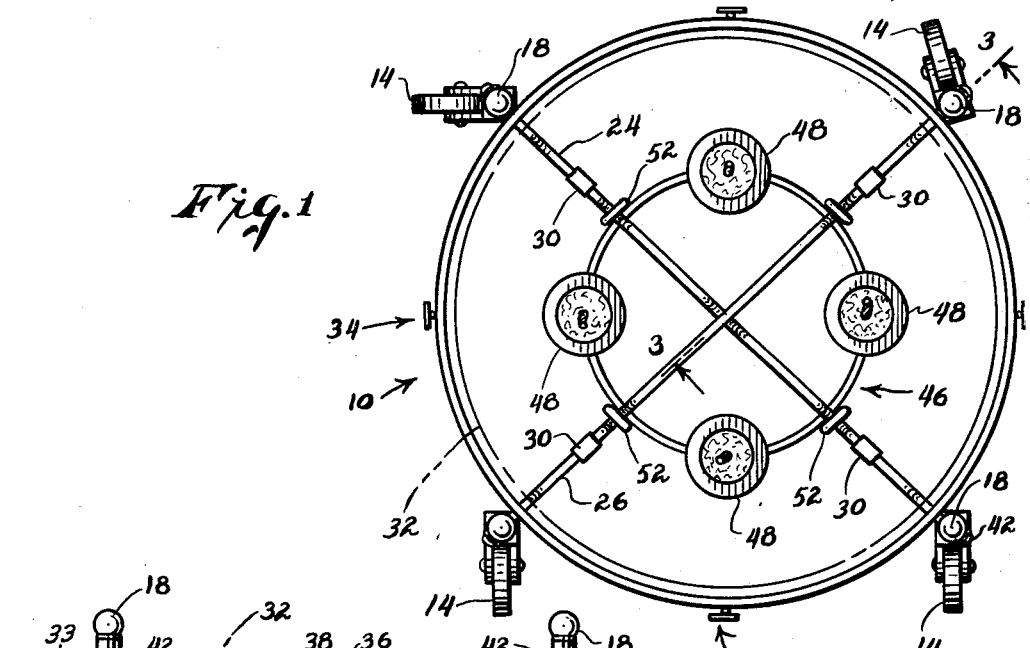
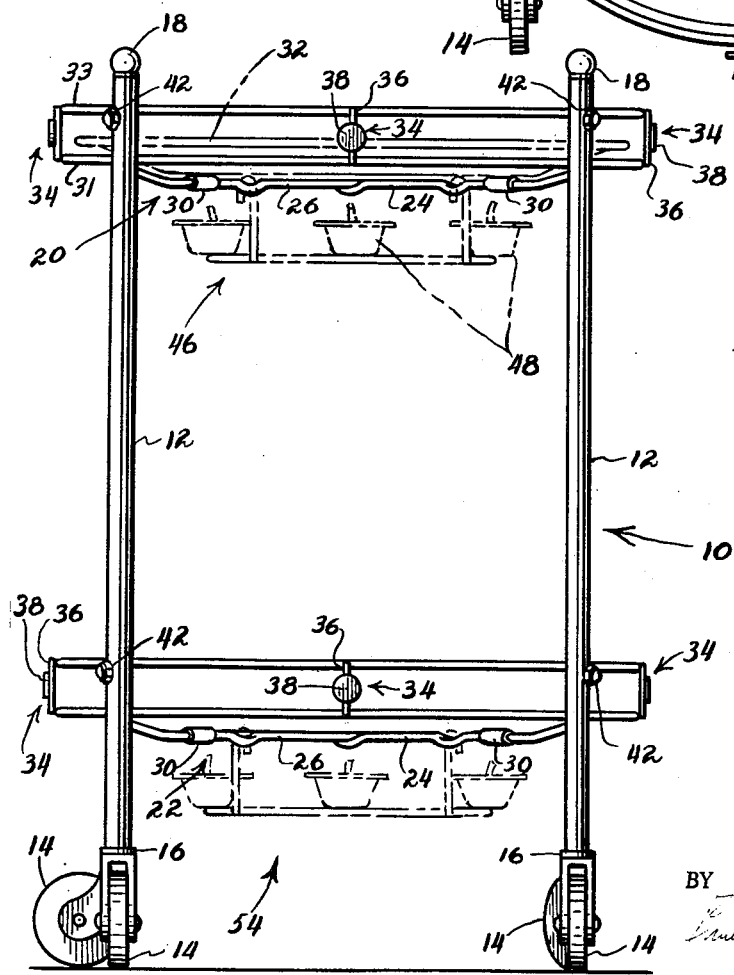

3,132,641
SERVING CART
Herman E. Schafer, 285 Highfield Lane, Nutley, N.J.
Filed Sept. 12, 1962, Ser. No. 223,090
3 Claims. (Cl. 126—268)

This invention relates to a wheeled cart and, more particularly, to a decorative wheeled cart carrying serving trays and which includes means for heating the trays.

Serving carts are often utilized by the modern hostess to eliminate the necessity of repeated trips back and form from the pantry to the area in which the trays are served. Particularly, with hot hors d'oeuvres, however, it is desirable that means be provided to keep the hors d'oeuvres warm while resting on the cart so as to be appetizing over an extended period.

For lightness, rigidity and attractiveness of appearance, it is desirable that such carts be fabricated out of conventional materials such as tubes and rod stock. However, due to various mailing restrictions, it becomes economically necessary that such carts be disassembled and shipped in the disassembled state. Due to the unknown level of skill of the ultimate user, it must be easy to assemble the cart and further, it is desirable that the cart, when assembled, have a rigid distortionless frame.

It is a primary object of this invention to provide a wheeled serving cart for economical construction which is provided with means for heating a removable tray structure upon which heated hors d'oeuvres may be placed.

It is a further object of this invention to provide a cart construction which can easily and simply be assembled into a composite structure from the component parts thereof, which component structure offers unusual rigidity.

In accordance with these objects, there is provided in a preferred embodiment of this invention a cart comprising vertically separated horizontal racks formed of tubular material adapted to receive thereon serving trays. In order to heat the serving trays to maintain the hors d'oeuvres and the like in heated state, a heating structure is provided which may be interchangeably suspended beneath either of the servng trays to provide heat thereto.

The racks for the serving trays are supported by tubular uprights terminating in wheel carriers. The uprights are provided with an aperture therethrough to receive the threaded end of a rod. Extending along the tube and contiguous with the aperture therein, the tube is depressed into a channel. The threaded rod is bent in an L-shaped form so as to be received by the channel and supportably engaged by the edges thereof. In this manner, a simple cap nut may be affixed to the exterior of the threaded rod and without other precautions, mere tightening of the nut will ensure a rigid, distortion-free structure.

Having briefly described this invention, it will be described along with other objects and advantages thereof in the following detailed description which may best be understood by reference to the accompanying drawings, of which:

FIG. 1 is a top plan view of a cart in accordance with the present invention;

FIG. 2 is a side elevation of the cart shown in FIG. 1;

FIG. 3 is a cross section taken along lines 3—3 in FIG. 1; and

FIG. 4 is a cross section taken along lines 4—4 of FIG. 3;

In the figures, there is shown as an illustrative and preferred embodiment, a serving cart 10 comprising four upright tubular supports 12. To enable the cart to be conveniently wheeled around by the hostess, large diameter caster wheels 14 are removably inserted within the bottom of the supports. A cap 16 is provided on each of the supports to decoratively seal the open end of the supports. The top end of each support rod is sealed by a decorative end cap 18. Racks 20 and 22 are positioned in a spaced relationship and supportably carried by the tubular supports. Each rack is formed from rod stock having cross members 24 and 26. Member 26 is indented so as to provide a flush surface. Short lengths of rubber hose 30 may be preferably slipped over each rod to provide a bumpered surface for receipt of a serving tray 32. The rack is provided with a peripheral rod member 31 of continuous form which is welded to the cross rods as they cross. To provide an edged surface, a second rod member 33 may be shaped into a ring of the same diameter as the lower ring and supported above said ring by decorative spacer 34. I prefer to utilize a straight length of a thinner rod 36 to which is welded an annular member 38.

For economy, the cart must be shipped in a disassembled state and assembled by the ultimate user. The supports are, therefore, provided with apertures extending therethrough and the ends of the cross rods are threaded so as to be insertable through the aperture and affixed thereto by a cap nut 42. In order that the cart be assembled easily and yet have a rigid and sturdy structure when assembled, each support member is indented into a channel structure extending from the aperture 40 therethrough. The end of the threaded rod is bent into a Z-shaped section to provide a vertical member 44 which will be received within end support by the indented channel in the rod. Thus, the user need merely insert the end of the rod into the aperture and tighten the cap nut thereon. The Z-shaped member will automatically nest within the channel portion thereby to provide lateral support and to effect a rigid structure even though composed of lightweight tubular stock.

In order to provide means for the hostess to heat the serving trays 32 which, for example, may be formed as round trays of aluminum or other material having good heat conductivity, there is provided a circular member 46 formed of rod stock along the periphery of which at spaced locations thereon are welded cups 48 to receive candles. The assembly is suspended from the cross rods by hanger hooks 50 welded to the periphery of the rod and which have a hooked shaped end 52 to engage the cross rods. It will be noted that the cross rods may, if desired, be indented at the position of support of the heat source. To facilitate removal of the heat source, all of the hooks face in the same rotational direction so that the heat source may be removed merely by lifting and rotating the heat source slightly to disengage the hooks. The heat source may then be easily removed for cleaning or may be interchanged to heat the bottom tray as indicated by dotted outline 54.

The trays are preferably made of aluminum or stainless steel material. The number of candles in each heat source may be varied as for example including more candles than the four illustrated. The candles are preferred since the candles provide a low-cost heat and long life candles are now available. Alternatively, the cups may be filled with other heat sources such as a jellied alcohol fuel. For different heats, of course, only a few of the candles need be lighted.

This invention may be variously modified and embodied within the scope of the subjoined claims.

What is claimed is:

1. A serving cart comprising a plurality of vertical supports, each of said supports comprising a tubular rod, tray racks supportably carried between said supports in vertically spaced position, each of said racks comprising cross members formed of rod stock welded together at the intersections thereof, and a ring shaped rod enclosing the periphery of said racks and welded to said cross members at the intersections thereof, trays removably insertable within each of said racks, and a heat source removably suspended below either of said racks, said heat source comprising a ring-shaped structure formed of rod material, a plurality of heat sources affixed to said ring about the periphery thereof, and a plurality of hangers affixed to said ring and extending upwardly into hooked engagement with said cross rods.

2. A serving cart in accordance with claim 1 which includes caster wheels of large diameter removably inserted within the ends of each of said tubular supports and which includes a decorative end cap inserted within the upper end of each of said tubular supports.

3. A serving cart in accordance with claim 1 which includes short lengths of hose encircling each of said cross rods in said tray racks.

References Cited in the file of this patent

UNITED STATES PATENTS

| | | |
|---|---|---|
| 2,122,275 | Bitney | June 28, 1938 |
| 2,742,300 | Carver | Apr. 17, 1956 |

FOREIGN PATENTS

| | | |
|---|---|---|
| 729,887 | France | May 3, 1932 |
| 821,284 | Great Britain | Oct. 7, 1959 |